US008460152B2

(12) United States Patent
Parsons et al.

(10) Patent No.: US 8,460,152 B2
(45) Date of Patent: Jun. 11, 2013

(54) AUTO-SELECTING TWO-RATIO TRANSMISSION

(75) Inventors: Scott Parsons, Toronto (CA); Gary J. Spicer, Mississauga (CA)

(73) Assignee: Litens Automotive Partnership, Woodbridge (CA)

( * ) Notice: Subject to any disclaimer, the term of this patent is extended or adjusted under 35 U.S.C. 154(b) by 237 days.

(21) Appl. No.: 12/936,247

(22) PCT Filed: Apr. 6, 2009

(86) PCT No.: PCT/CA2009/000438
§ 371 (c)(1),
(2), (4) Date: Nov. 3, 2010

(87) PCT Pub. No.: WO2009/121188
PCT Pub. Date: Oct. 8, 2009

(65) Prior Publication Data
US 2011/0053729 A1    Mar. 3, 2011

Related U.S. Application Data

(60) Provisional application No. 61/042,439, filed on Apr. 4, 2008.

(51) Int. Cl.
*F16H 3/44* (2006.01)
(52) U.S. Cl.
USPC .......................................... 475/283; 475/318
(58) Field of Classification Search
USPC ................. 475/210, 211, 283, 318; 192/48.2, 192/48.4, 48.92, 3.52
See application file for complete search history.

(56) References Cited

U.S. PATENT DOCUMENTS

| 1,080,642 | A |   | 12/1913 | MacFarland |         |
|-----------|---|---|---------|------------|---------|
| 1,140,132 | A |   | 5/1915  | Dorsey     |         |
| 1,235,046 | A |   | 7/1917  | Nikonow    |         |
| 2,473,250 | A |   | 6/1949  | Hoffman    |         |
| 2,537,057 | A |   | 1/1951  | Hulman et al. |     |
| 3,082,647 | A | * | 3/1963  | Banker     | 475/140 |
| 3,270,207 | A |   | 8/1966  | Stockton   |         |
| 3,361,010 | A |   | 1/1968  | Miller     |         |
| 3,481,220 | A |   | 12/1969 | Kaptur     |         |
| 3,685,622 | A | * | 8/1972  | Baer et al. | 192/35 |
| 4,446,757 | A |   | 5/1984  | LaFever    |         |

(Continued)

FOREIGN PATENT DOCUMENTS

CA    1172876    8/1984
CA    1273504    9/1990

(Continued)

OTHER PUBLICATIONS

Supplementary European Search Report dated May 11, 2011 in related European Patent Application No. EP 09 72 8093.

(Continued)

*Primary Examiner* — Justin Holmes
(74) *Attorney, Agent, or Firm* — Millman IP Inc.

(57) ABSTRACT

A pulley assembly with an auto-selecting multi-speed transmission that can be operated in at least two modes depending on the manner in which rotary power is transmitted through the pulley assembly.

20 Claims, 12 Drawing Sheets

U.S. PATENT DOCUMENTS

| | | | |
|---|---|---|---|
| 4,589,303 A | 5/1986 | Roberts | |
| 4,667,537 A * | 5/1987 | Sivalingham | 475/256 |
| 4,862,009 A | 8/1989 | King | |
| 5,378,210 A * | 1/1995 | Teraoka | 475/312 |
| 5,418,400 A | 5/1995 | Stockton | |
| 5,842,944 A * | 12/1998 | Morishita et al. | 475/154 |
| 6,306,057 B1 | 10/2001 | Morisawa et al. | |
| 6,371,877 B1 | 4/2002 | Schroeder et al. | |
| 6,832,970 B2 | 12/2004 | Eibler | |
| 7,028,794 B2 | 4/2006 | Odahara et al. | |
| 7,086,981 B2 | 8/2006 | Ali et al. | |
| 2003/0051960 A1 * | 3/2003 | Li et al. | 192/28 |
| 2003/0085091 A1 * | 5/2003 | Ichihara et al. | 192/45 |
| 2004/0038769 A1 | 2/2004 | Eibler | |
| 2005/0153813 A1 | 7/2005 | Serkh | |

FOREIGN PATENT DOCUMENTS

| | | |
|---|---|---|
| CA | 2397181 | 11/2001 |
| EP | 0384808 A1 | 8/1990 |
| EP | 0 384 808 A1 | 9/1991 |
| JP | 63275434 | 11/1988 |
| JP | 04321850 | 11/1992 |
| WO | 2004018904 A1 | 3/2004 |
| WO | 2005083305 A1 | 9/2005 |
| WO | 2005103527 A1 | 11/2005 |
| WO | 2007116220 A1 | 10/2007 |

OTHER PUBLICATIONS

EP12007090.9, European Search Report, Dec. 21, 2012.

* cited by examiner

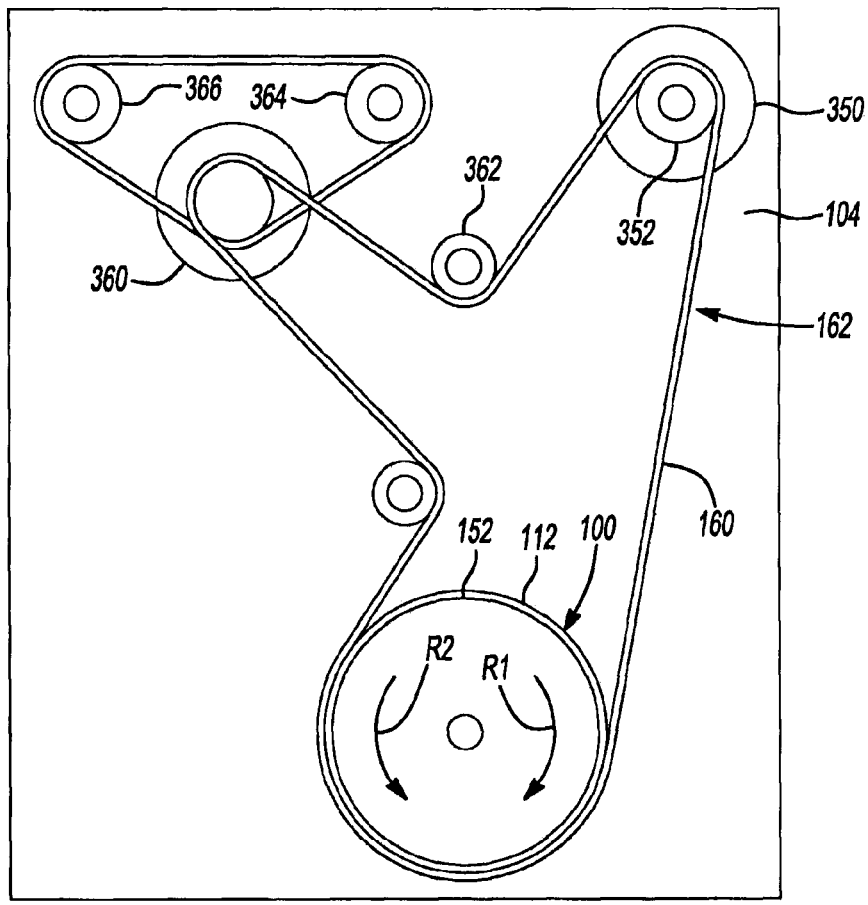
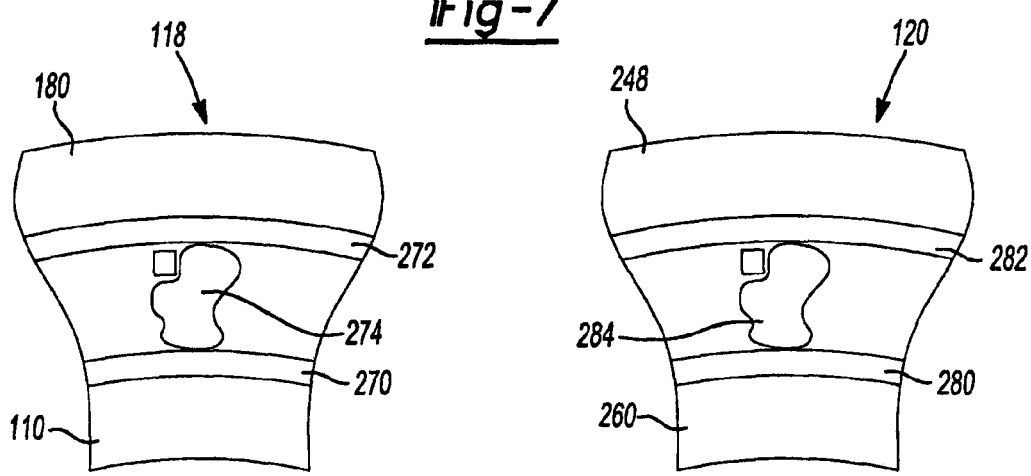
*Fig-7*
*Fig-8*   *Fig-9*

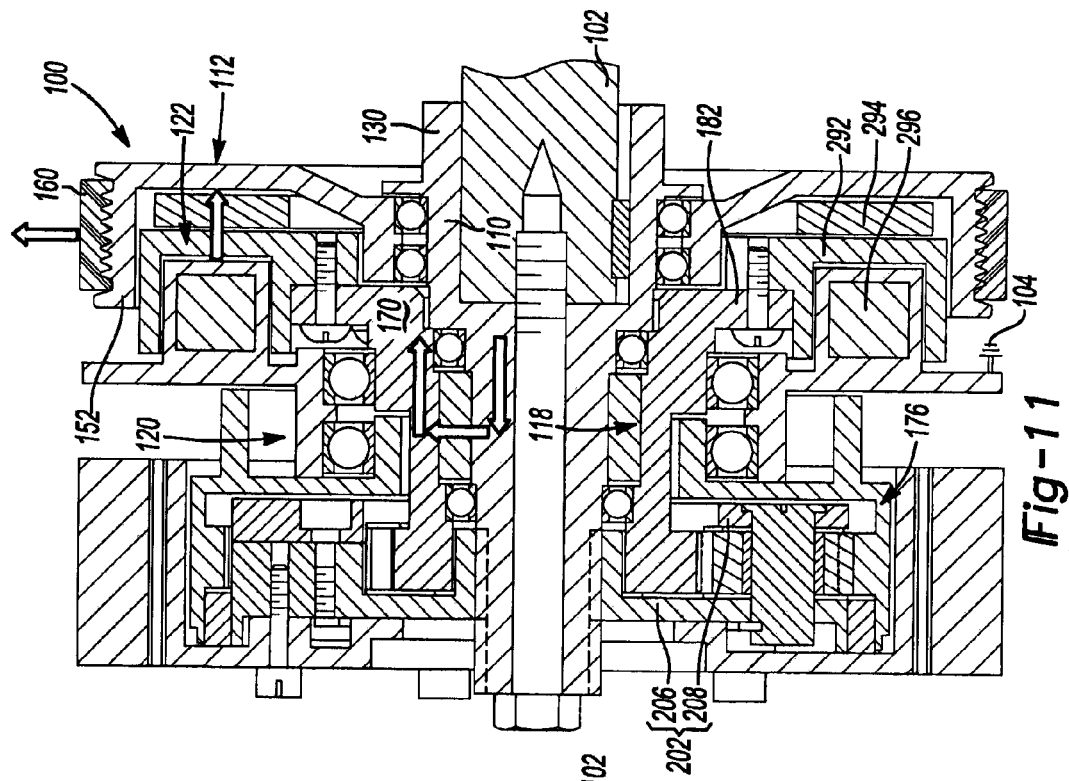
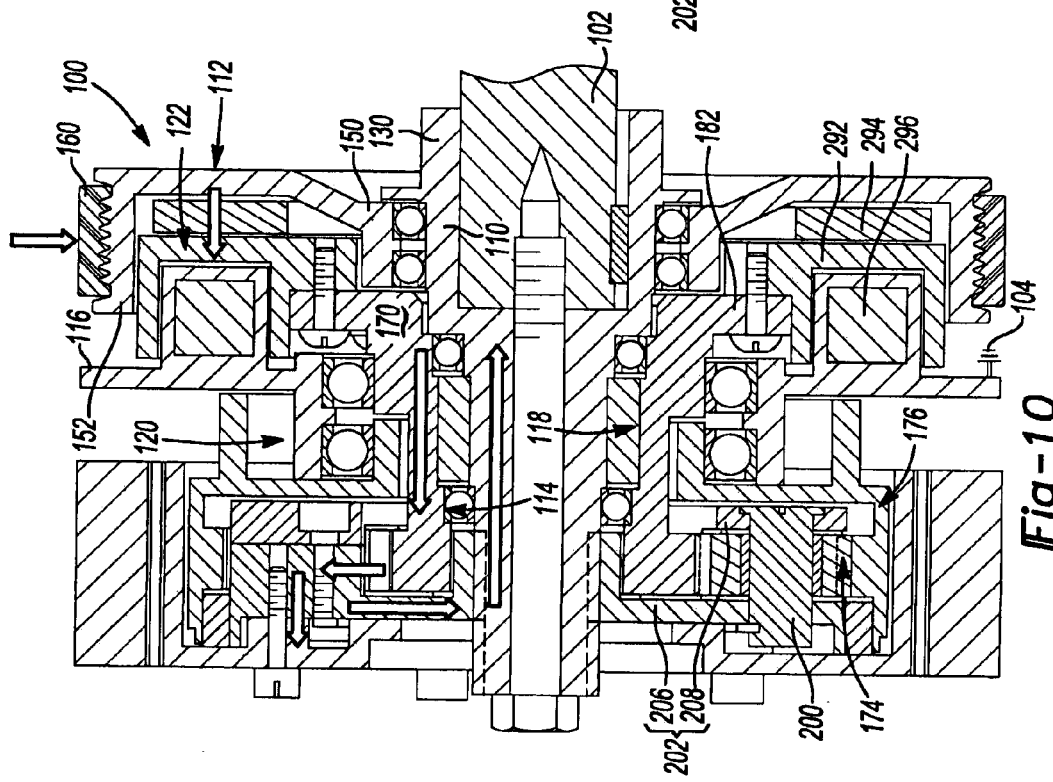

AUTO-SELECTING TWO-RATIO TRANSMISSION

CROSS-REFERENCE TO RELATED APPLICATIONS

This application is a 371 of PCT/CA2009/000438 filed Apr. 06, 2009, which claims the benefit of U.S. Provisional No. 61/042,439 filed Apr. 4, 2008.

INTRODUCTION

The present disclosure generally relates to an auto-selecting two-ratio transmission and more particularly to a pulley assembly with an auto-selecting two-ratio transmission.

Transmissions which provide different rotation ratios between an input and an output shaft are well known. Depending upon the rotation ratio between the input and output shafts, the torque transferred from the input shaft to the output shaft through the transmission can be increased or decreased and the rotation speed of the output shaft is correspondingly decreased or increased relative to the rotation speed of the input shaft.

It is also known to have a transmission which can provide more than one ratio between the input and the output of the transmission. The desired ratio can be selected from the available ratios in a variety of manners, typically involving the movement of one or more of the gears in the transmission gear train into or out of engagement with one or more other gears in the gear train.

It is also known to have a two-ratio transmission which can be connected between two devices and which provides a first ratio when torque is transferred from the first device to the second device and which provides a second ratio when torque is transferred from the second device to the first device.

An example of such a two-ratio auto-selecting transmission is taught in published World Patent WO 2007/116220 to Barker et al. which teaches a transmission that is installed between the crankshaft of the internal combustion engine and the belt of a belt alternator/starter (BAS) system of a vehicle employing a start-stop hybrid strategy.

With the Barker transmission in a BAS system, when the internal combustion engine is running, torque is transferred from the crankshaft of the engine, through the transmission at a one to one ratio, to the alternator/starter via the belt and the alternator produces electrical current in a conventional manner.

Conversely, when the engine has been shut down and it is desired to restart the engine, electrical current is provided to the alternator/starter from a battery, or other storage system, and the alternator/starter operates as an electric motor. The torque produced by the alternator/starter is transferred, by the belt, and through the transmission at a three to one ratio to the crankshaft of the engine, which rotates to restart the engine.

By providing a first ratio which is greater than one to one when torque is transferred through the transmission from the alternator/starter to the crankshaft, the amount of torque which must be carried by the belt in the BAS system is reduced. The second ratio, which is a one to one ratio, is utilized when torque is transferred in the opposite direction, from the engine to the alternator/starter. This one to one ratio allows the alternator/starter to be driven by the engine at a lower speed than would the case with the first ratio (greater than one to one ratio) provided for starting the engine and thus avoids overspeed operation of the alternator/starter when the alternator/starter is operating as an alternator.

Without the Barker transmission, the very high torque levels the belt would be required to carry to rotate the crankshaft to restart the engine (for example, one hundred and fifty Newton-meters or more), would require a very high belt tension to inhibit slippage. Also, the belt would have to be very robust to carry these torque levels and would thus be very stiff. As is known, high tension levels and stiff belts result in high levels of parasitic losses in belt drive systems and such parasitic losses reduce the fuel efficiency of the vehicle and reduce the expecting operating lifetime of the BAS system.

While the Barker transmission does provide advantages, it suffers from disadvantages in that it requires two planetary gear trains to provide the desired first and second ratios and thus the transmission is expensive to manufacture. Further, the planetary gear trains are operating when torque is transferred at either ratio through the transmission. Thus, the gear trains are operating when starting the internal combustion engine with the BAS system but are also operating the entire time that the internal combustion engine is running and driving the alternator/starter, leading to unacceptable operating noise and a reduced operating lifetime for the transmission.

It is desired to have an auto-selecting two-ratio transmission system which does not suffer from these disadvantages.

SUMMARY

This section provides a general summary of some aspects of the present disclosure and is not a comprehensive listing or detailing of either the full scope of the disclosure or all of the features described therein.

In one form, the present teachings provide a pulley assembly having a hub, a pulley rotatably mounted on the hub, a transmission, a torque reaction member, a first clutch, a second clutch and a third clutch. The transmission has an input member and an output member. The first clutch is disposed between the input member and the hub. The first clutch couples the input member to the hub when the hub transmits rotary power to the input member as the hub rotates in a first rotational direction. The second clutch is disposed between the torque reaction member and a reduction element of the transmission. The second clutch is operable in a first mode that couples the torque reaction member to the reduction element to cause the transmission to operate such that a speed reduction and torque multiplication operation is performed by the transmission and output from the output member to the hub. The second clutch is operable in a second mode in which the torque reaction member is decoupled from the reduction element. The third clutch selectively couples the pulley to the input member to cause the pulley to co-rotate with the input member.

In another form, the present teachings provide a pulley assembly that is configured to transmit rotary power between a crankshaft and a vehicle accessory drive system. The pulley assembly includes a crankshaft adapter, a pulley, a transmission and a clutch system. The crankshaft adapter is configured to be coupled to the crankshaft. The pulley is rotatably mounted on the crankshaft adapter. The transmission has a transmission input and a transmission output. The clutch system permits the pulley assembly to be operated in a first mode, a second mode and a third mode. The first mode is configured to couple the crankshaft adapter to the pulley to permit the pulley to co-rotate with the crankshaft adapter in a first rotational direction such that rotary power is transmitted from the crankshaft adapter to the pulley. The second mode is configured to couple the pulley to the crankshaft adapter through the transmission such that the transmission performs a torque multiplication and speed reduction function which causes the crankshaft adapter to rotate in the first rotational direction at a speed that is slower than a rotational speed of the pulley. The third mode is configured to decouple the pulley from the crankshaft adapter such that rotation of the pulley does not effect rotation of the crankshaft adapter.

In yet another form, the present teachings provide a pulley assembly having a shaft adapter, a pulley that is rotatably mounted on the shaft adapter, a transmission, a bracket, a wrap spring clutch and an overrunning clutch. The transmission has a transmission input, a transmission output and a reduction element. The bracket is configured to be coupled to a stationary object. The wrap spring clutch is disposed concentrically between the shaft adapter and the transmission output member. The overrunning clutch couples the reduction element to the bracket to permit rotation of the reduction element relative to the bracket in a first rotational direction but inhibit rotation of the reduction element relative to the bracket in a second rotational direction opposite the first rotational direction.

Further areas of applicability will become apparent from the description provided herein. It should be understood that the description and specific examples in this summary are intended for purposes of illustration only and are not intended to limit the scope of the present disclosure, its application and/or uses in any way.

BRIEF DESCRIPTION OF THE DRAWINGS

The drawings described herein are for illustrative purposes only and are not intended to limit the scope of the present disclosure in any way. The drawings are illustrative of selected teachings of the present disclosure and do not illustrate all possible implementations. Similar or identical elements are given consistent identifying numerals throughout the various figures.

FIG. 7 is a schematic illustration of an engine having an accessory drive system with the pulley assembly of FIG. 6;

FIG. 8 is an elevation view of a portion of the pulley assembly of FIG. 6 illustrating a portion of the first clutch in more detail;

FIG. 9 is an elevation view of a portion of the pulley assembly of FIG. 6 illustrating a portion of the second clutch in more detail;

FIG. 10 is a view similar to that of FIG. 6 but illustrating the transmission of rotary power through the pulley assembly when the pulley assembly is operated in a first mode;

FIG. 11 is a view similar to that of FIG. 6 but illustrating the transmission of rotary power through the pulley assembly when the pulley assembly is operated in a second mode;

DETAILED DESCRIPTION OF THE VARIOUS EMBODIMENTS

Figure 1:
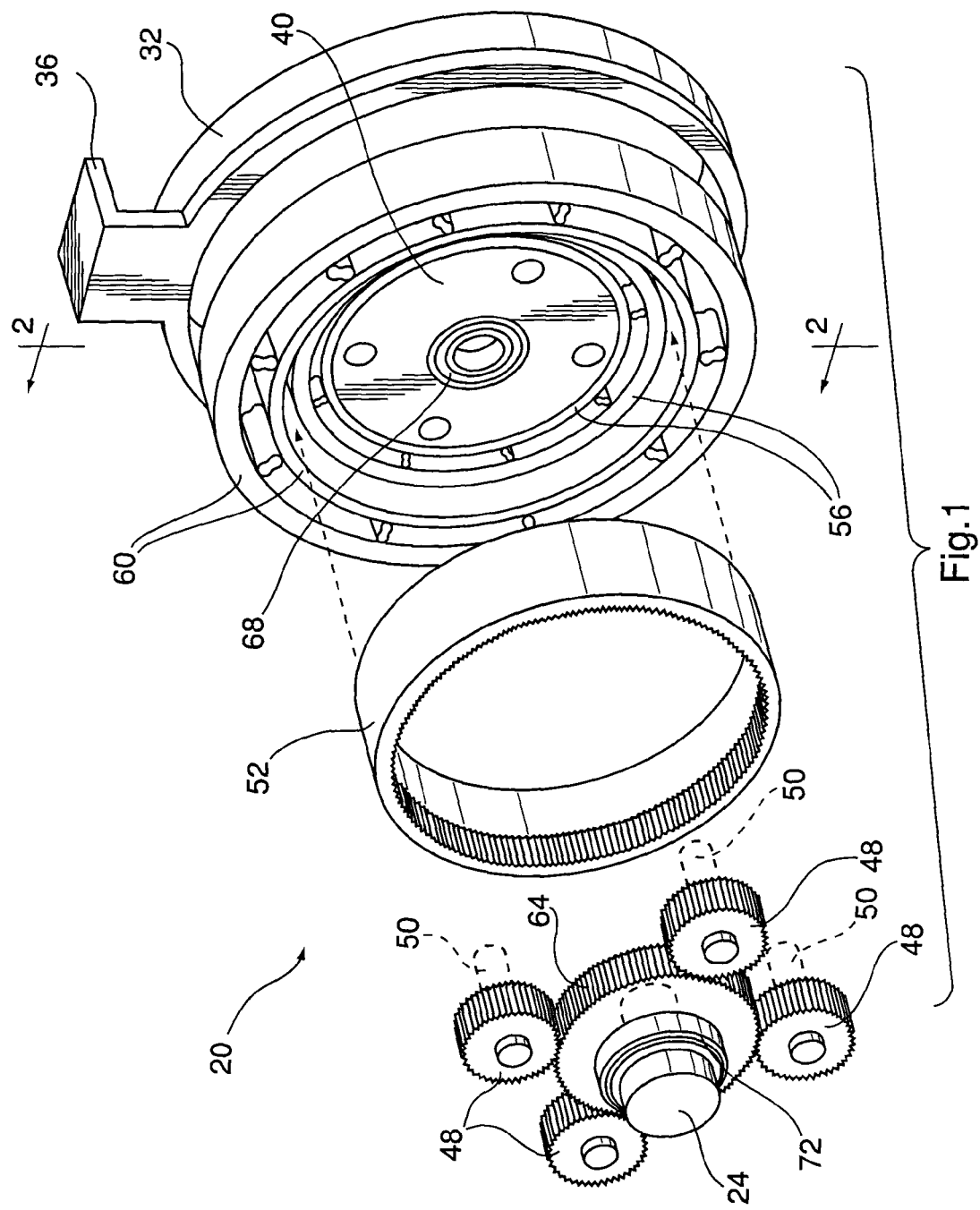
FIG. 1 is a perspective exploded view of a transmission constructed in accordance with the teachings of the present disclosure.

A transmission in accordance with the present disclosure is indicated generally at 20 in FIGS. 1 through 5. In this embodiment, transmission 20 includes a first connector 24 and a second connector 28. While first connector 24 and second connector 28 are illustrated in the Figures as being shafts, it will be apparent to those of skill in the art that the present disclosure is not so limited and first connector 24 and/or second connector 28 can comprise any suitable couplers, mounts for pulleys, etc. as may be desired to input torque to and receive torque from transmission 20.

First connector 24 can be connected to a device (not shown), such as a pulley linked to an alternator/starter by a belt or directly to the drive shaft of an alternator/starter. Second connector 28 can be connected to another device, such as the crankshaft (not shown) of an internal combustion engine, etc.

Transmission 20 further includes a housing 32, which can include one or more mounting features 36 to permit transmission 20 to be mounted to an appropriate surface, such as the front of an internal combustion engine while preventing movement of housing 32.

Figure 2:
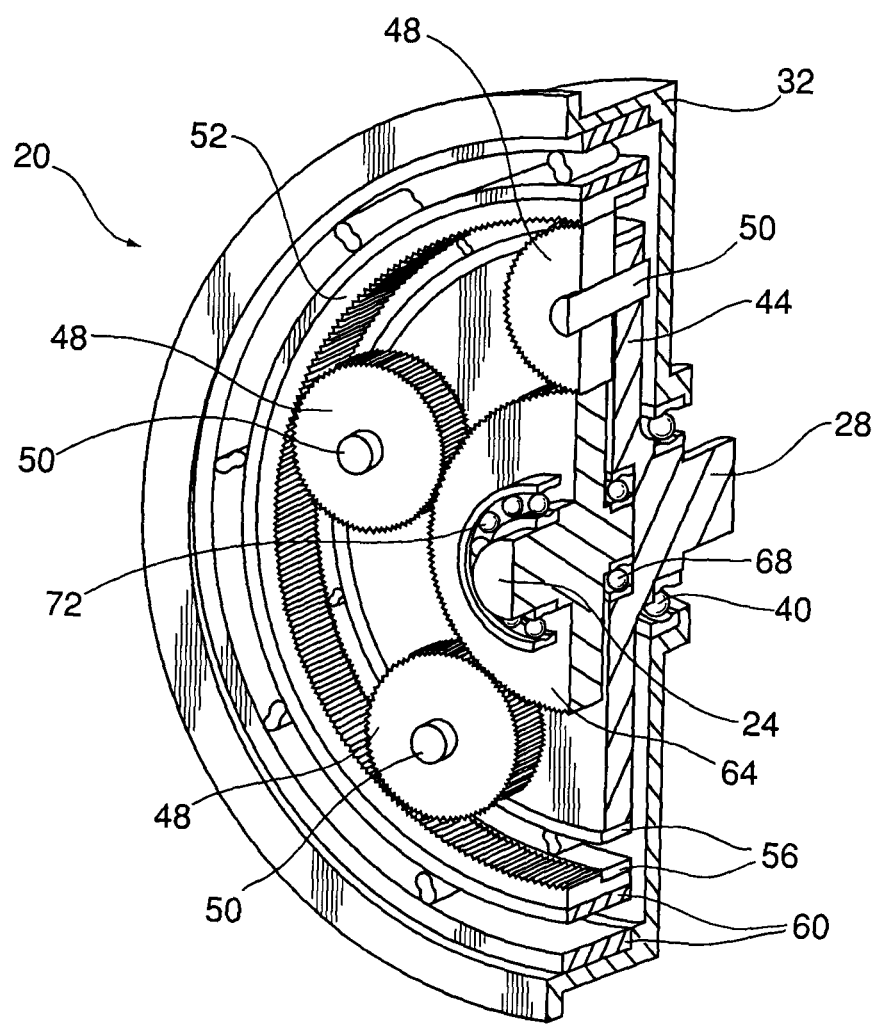
FIG. 2 is a perspective cross section taken along the line 2-2 of FIG. 1.

As best seen in FIG. 2, second connector 28 is rotatably mounted to housing 32 by a bearing 40 and second connector 28 is integrally formed with, or mounted to, a disc-shaped planet gear carrier 44. At least one, and in the illustrated embodiment five, planetary gears 48 are rotatably mounted to planet gear carrier 44 by gear pins 50. While planetary gears 48 are straight cut gears in the Figures, it will be apparent to those of skill in the art that the present disclosure is not limited to the use of straight cut gears and helical, or other gear tooth designs, can be employed as desired.

A ring gear 52 engages planetary gears 48 and is mounted between planet gear carrier 44 and housing 32 by a first one-way clutch 56 and a second one-way clutch 60, each of which comprises an inner race and an outer race. Each of the one-way clutches operate such that the outer race can overrun the inner race when the outer race is rotated in one direction and such that the outer race is locked to the inner race when the outer race is rotated in the opposite direction.

First one-way clutch 56 allows ring gear 52 to rotate, in one direction (clockwise in the orientation illustrated in FIGS. 1 and 2) with respect to planet gear carrier 44. Second one-way clutch 60 allows ring gear 52 to rotate, in the same direction (clockwise in the orientation illustrated in FIGS. 1 and 2) with respect to housing 32.

In the illustrated embodiment, first one-way clutch 56 and a second one-way clutch 60 are shown as being sprag clutches, such as those manufactured by Emerson Power Transmission, 7120 New Buffington Road, Florence, Ky., USA under their Morse brand. However, the present disclosure is not limited to the use of sprag clutches for first one-way clutch 56 and a second one-way clutch 60 and any suitable one-way clutch mechanism can be employed as will occur to those of skill in the art and that different clutch mechanisms can be employed for first one-way clutch 56 and a second one-way clutch 60 if desired.

For example, it is contemplated that roller clutches, cam clutches or pawl and ratchet clutches can be employed as either or both of first one-way clutch 56 and a second one-way clutch 60, as desired. Further, it is contemplated that one-way clutch mechanisms which require operate in conjunction with a separate bearing can also be employed if desired. For example, a wire-wound spring (similar to those used in over-running decouplers for alternators or other devices, such as that described in published World Patent WO 2005/057037 to Jansen et al., assigned to the assignee of the present disclosure) can be employed along with a bearing to obtain a suitable one-way clutch mechanism.

First connector 24 is mounted to a sun gear 64 and is rotatably mounted to planet gear carrier 44 by a bearing 68 and sun gear 64 engages planetary gears 48. An outer bearing 72 allows first connector 24 to rotate with respect to a cover plate 76 (shown in FIG. 3) which first connector 24 extends through, cover plate 76 engaging housing 32 to enclose transmission 20.

Figure 3:
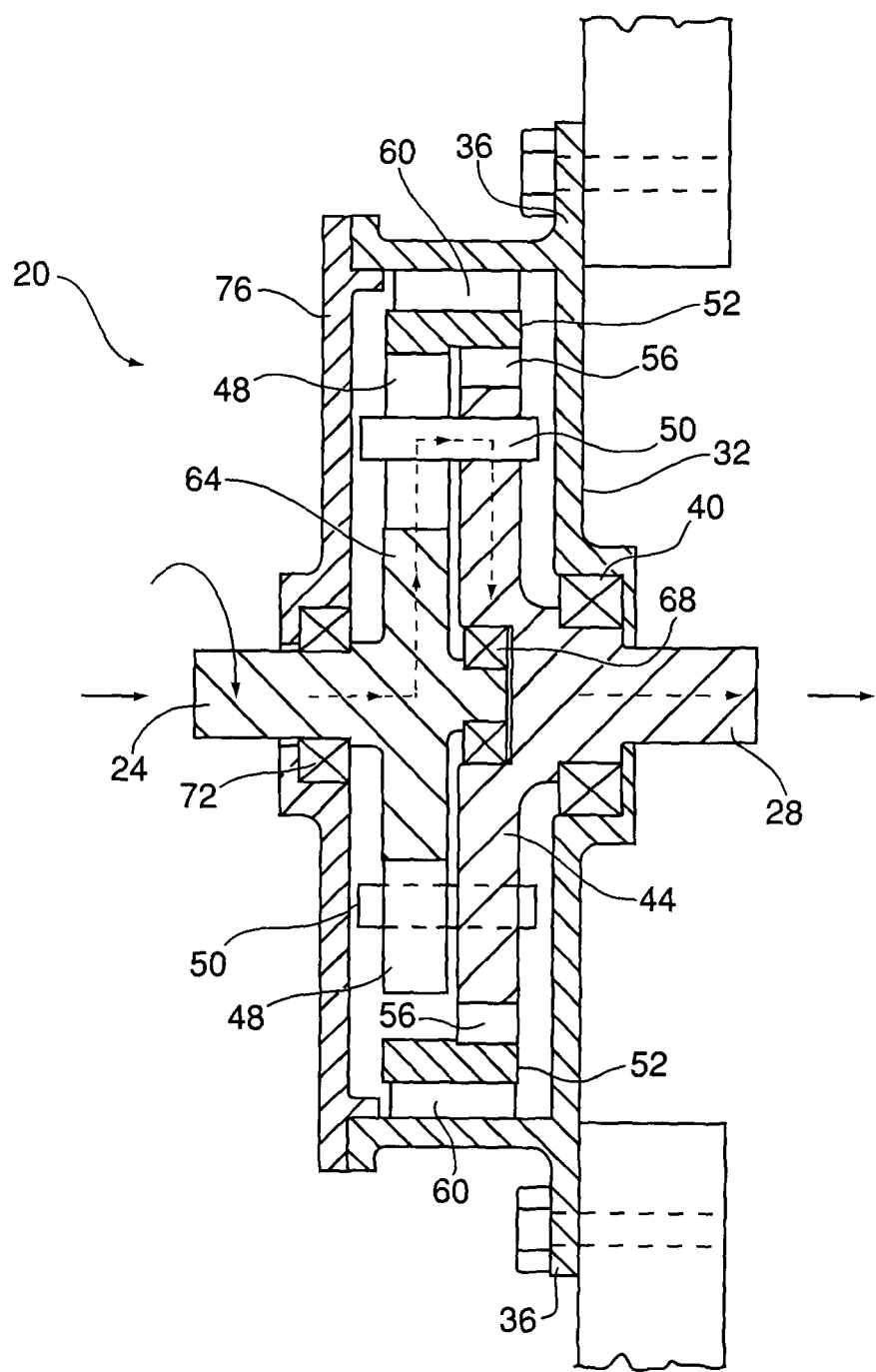
FIG. 3 is a cross section taken along the line 2-2 of FIG. 1, with a transmission housing cover in place, showing a transfer of torque through the transmission at a selected ratio.
Figure 4:
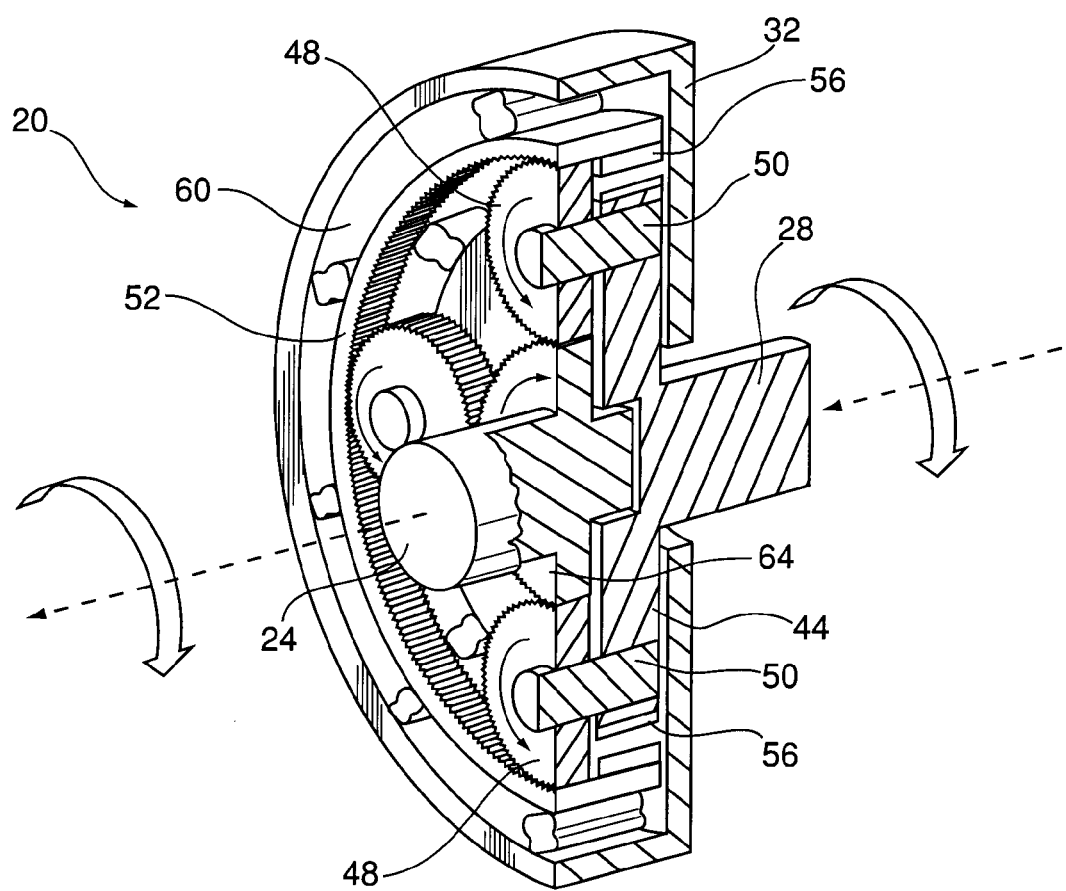
FIG. 4 is a perspective cross section taken along the line 2-2 of FIG. 1 illustrating the transmission operating in a torque multiplication and speed reduction mode.

FIGS. 3 and 4 show transmission 20 transferring torque from first connector 24 to second connector 28. In the illustrated example, first connector is rotated clockwise by a torque generating device, such as an alternator/starter which is functioning as a starter. With this transfer of torque, torque applied to first connector 24 causes sun gear 64 to rotate clockwise on bearings 68 and 72. Planet gears 48 are thus rotated counterclockwise by sun gear 64 and act against ring gear 52.

Ring gear 52 attempts to rotate counterclockwise but is prevented from doing so by second one-way clutch 60 which locks. Thus, planet gears 48 move along ring gear 52, rotating planet carrier 44 (via gear pins 50) clockwise with respect to ring gear 52 (and housing 32) outputting torque to second connector 28.

As will be understood by those of skill in the art, the configuration of sun 64, ring gear 52 and planetary gears 48 reduces the rotation ratio of planet carrier 44 with respect to the rotation applied to first connector 24. In a present embodiment of the disclosure, the design of planetary gears 48, sun gear 64 and ring gear 52 is selected such that a three to one rotation ratio is achieved by this gear train.

Thus, the rotation speed of second connector 28 is one-third the rotation speed of first connector 24 and the torque at second connector 28 is, ignoring the effects of mechanical losses through transmission 20, three times the torque at first connector 24. However, it will be understood by those of skill in the art, that the present disclosure is not limited to use with a three to one ratio for torque transfer from first connector 24 to second connector 28 and it is contemplated that ratios from two point five to one to as much as seven to one, or higher, can be employed if desired.

Figure 5:
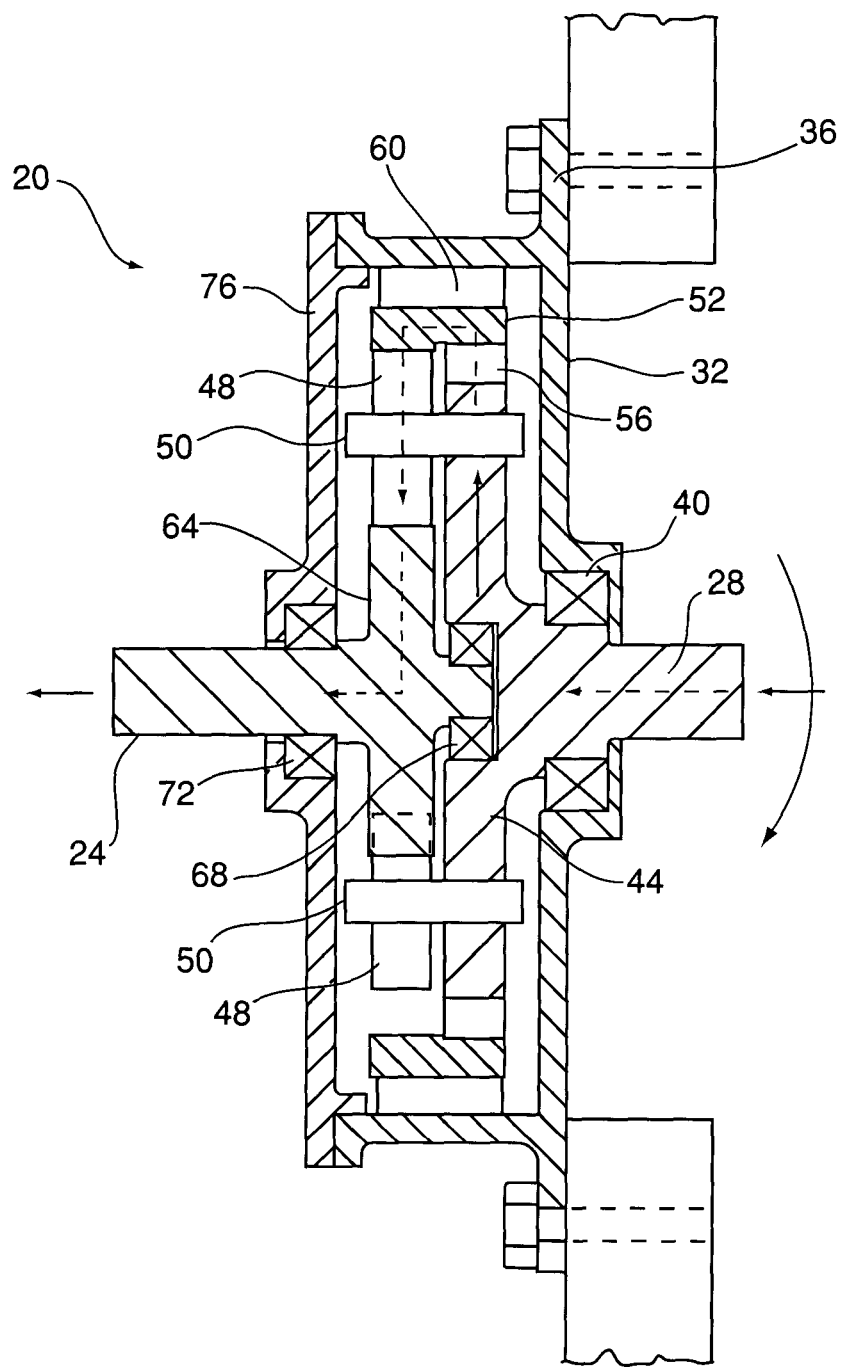
FIG. 5 is a cross section taken along the line 2-2 of FIG. 1, with a transmission housing cover in place, illustrating the transmission operating in a mode in which the torque and speed of an output of the transmission are equal to the torque and speed of the output of the transmission.

FIG. 5 shows transmission 20 transferring torque from second connector 28 to first connector 24. In the illustrated example, second connector 24 is connected to a device which generates torque, such as the crankshaft of an internal combustion engine. As before, the torque applied to second connector 28 rotates second connector clockwise (when viewed from the orientation of FIG. 2).

Torque applied to second connector 28 causes planet carrier 44 to rotate clockwise. As planet carrier 44 rotates, planetary gears 48 apply torque to ring gear 52 which attempts to also rotate clockwise but first one-way clutch 56 locks to fix ring gear 52 relative to planet gear carrier 44. With first one-way clutch 56 locked, preventing planetary gears 48 from rotating about gear pins 50, second one-way clutch 60 allows ring gear 52 to rotate clockwise with respect to housing 32. Thus, planet gear carrier 44, ring gear 52, planetary gears 48, sun gear 64 and first connector 24 rotate as a single unit, with no relative movement between sun gear 64 and planetary gears 48 or ring gear 52, clockwise on bearings 68 and 72. As will be apparent, in this configuration transmission 20 essentially acts as a solid pulley wherein torque applied to second connector 28 is transferred to first connector 24 with a one to one rotation ratio.

If transmission 20 is employed as a component in a BAS system, second connector 28 can be connected to the crankshaft of an internal combustion engine, either directly, through a suitable coupler, or indirectly via a pulley or sprocket connected to the crankshaft through a belt, chain or set of gears. First connector 24 can be connected to a pulley to receive the belt from the alternator/starter.

In such a configuration, the rotation ratio increase produced by transmission 20 when transferring torque from first connector 24 to second connector 28 allows the torque which must be transferred by the belt from the alternator/starter to transmission 20 to be reduced. For example, if the crankshaft of the engine requires one-hundred and fifty Newton-meters of torque to be applied at a speed of one hundred rpm to start the engine, and if transmission 20 provides a rotation ratio of three to one for torque transferred from first connector 24 to second connector 28, then the alternator/starter can be designed to deliver fifty Newton-meters of torque at a speed of about three hundred rpm to first connector 24.

As a result of the three to one rotation ratio provided by transmission 20, the crankshaft will have the necessary one hundred and fifty Newton-meters of torque applied to it from second connector 28 at a speed of about one hundred rpm to three hundred rpm. Thus, the torque which the BAS belt must carry is significantly reduced, with the commensurate benefits. Further, the alternator/starter may be reduced in size/capacity as the alternator now need only produce one third of the torque required to restart the engine, albeit at a higher speed.

In any event, when the internal combustion engine is running, and the alternator/starter is operating as an alternator, the one to one rotation ratio provided by transmission 20 results in the alternator being rotated at a speed directly related to the speed of the crankshaft.

Also, it is contemplated that a BAS system including transmission 20 can be employed as a primary starting (to cold start an internal combustion engine) in addition to a system for restarting the engine, as the torque required to be carried by the starting belt can be reduced to acceptable levels by selecting an appropriate rotation ratio for transmission 20.

Transmission 20 can also be included in an alternator/starter system for restarting an internal combustion engine wherein the alternator/starter is directly connected to first connector 24 without a belt. In such a case advantages are still obtained as the alternator/starter can be sized to produce torque at a lower level than would otherwise be required if the alternator/starter was directly connected to the crankshaft of the internal combustion engine and the alternator/starter will not be operated at excessive speed which the internal combustion engine is operating.

As should now be apparent to those of skill in the art, transmission provides several advantages over prior art auto-selecting two-ratio transmissions and, in particular, when such transmissions are used for BAS systems. In particular, unlike the prior art, the gear train of planetary gears 48, ring gear 52 and sun gear 64 only undergo relative movement when the BAS system is starting the internal combustion engine and no relative movement of the gear train occurs when the internal combustion engine is running. Because the gear train only operates when the BAS system is starting the internal combustion engine, and not when the engine is operating, wear on the gear train is reduced and unwanted noise, otherwise created by the operation of the gear train, is avoided.

Thus, the present disclosure provides a novel auto-selecting two-ratio transmission which provides a selected rotation ratio when torque is transferred from a first connector to a second connector and provides a one to one ratio when torque is transferred from the second connector to the first connector. When providing the one to one ratio, the gears in the gear train of the transmission do not rotate relative to one another, thus avoiding wear and preventing the creation of undesired noise. Selection of the ratio provided by the transmission is entirely automatic, depending only upon whether the torque is transferred from the first connector to the second connector or from the second connector to the first connector. The transmission can be employed as part of a BAS system to reduce the torque which the belt from the alternator/starter would have to carry to start an internal combustion engine.

As will be appreciated from the above discussion, the teachings of the present disclosure have application to a wide variety of drive systems in which an endless power transmitting element, such as a belt or a chain, is employed to transmit rotary power between drive and driven members (e.g., pulleys, sprockets).

Figure 6:
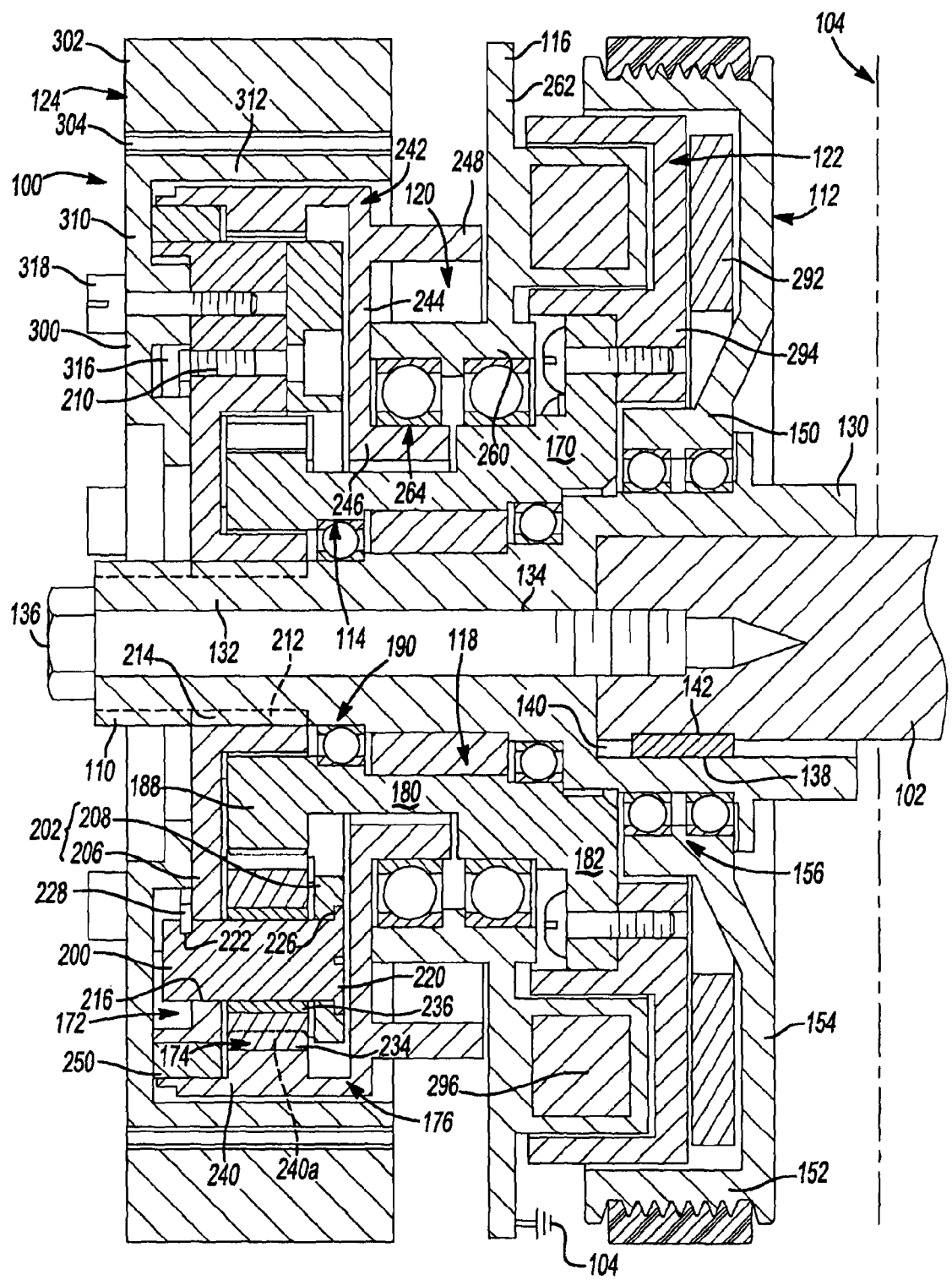
FIG. 6 is a cross sectional view of another pulley assembly constructed in accordance with the teachings of the present disclosure.

In the example of FIG. 6, a pulley assembly 100 constructed in accordance with the teachings of the present disclosure is illustrated in operative association with a crankshaft 102 of an internal combustion engine 104. The pulley assembly 100 can include a crankshaft adapter 110, a pulley 112, a transmission 114, a bracket 116, a first clutch 118, a second clutch 120, a third clutch 122 and a torsional vibration damper 124. The crankshaft adapter or hub 110 can be configured to facilitate the assembly of the pulley assembly 100 and the subsequent assembly of the pulley assembly 100 to the crankshaft 102. Those of skill in the art will appreciate from this disclosure that the pulley assembly 100 can be directly coupled to the crankshaft 102 in the alternative and in such situation, the crankshaft adapter 110, or portions thereof, may not be employed in a pulley assembly constructed in accordance with the teachings of the present disclosure. In the particular example provided, the crankshaft adapter 110 includes a first adapter portion 130, which is configured to be received over an end of the crankshaft 102, and a second adapter portion 132. One or more apertures 134 can be formed through the crankshaft adapter 110 and can be sized to receive threaded fasteners 136 that can be threadably engaged to the crankshaft 102 to fixedly but removably couple the crankshaft adapter 110 to the crankshaft 102. A keying system can be employed to couple the crankshaft adapter 110 to the crankshaft 102 in a predetermined orientation. In the example provided, the keying system include a key 138 that is disposed in corresponding slots 140 and 142 formed in the crankshaft adapter 110 and the crankshaft 102, but it will be appreciated that other devices, such as pins, could be used in the alternative.

The pulley 112 can include a pulley hub 150, a pulley rim 152, and a pulley web 154 that can couple the pulley hub 150 and the pulley rim 152 to one another. A set of bearings 156 can be received between the pulley hub 150 and the crankshaft adapter 110 such that the pulley hub 150 is mounted for rotation on the crankshaft adapter 110. The pulley rim 152 can be configured to driving engage an accessory belt 160 (FIG. 7) that can be employed to transmit rotary power through a vehicle accessory drive system 162 (FIG. 7).

The transmission 114 is illustrated to be a single-stage planetary-type transmission in the example provided, but it will be appreciated that the transmission 114 could be configured with a plurality of stages. The transmission 114 can include a sun gear 170, a planet carrier 172, a plurality of planet gears 174, and a ring gear 176.

The sun gear 170 can be an input member of the transmission 114 and can include a sun gear body 180 and a sun gear flange 182 that is coupled to an end of the sun gear body 180. The sun gear body 180 can be a hollow-sleeve-like structure having a plurality of sun gear teeth 188 at an end opposite an end to which the sun gear flange 182 is coupled. A set of bearings 190 can be received between the sun gear body 180 and the crankshaft adapter 110 to rotatably mount the sun gear 170 on the crankshaft adapter 110 at a location in which the sun gear flange 182 is axially offset from the pulley hub 150.

The planet carrier 172 can be an output member of the transmission 114 and can include a plurality of carrier pins 200, which can journally support the planet gears 174, and a carrier structure 202 that can be rotatably coupled to the crankshaft adapter 110. In the example provided, the carrier structure 202 includes a first carrier member 206 and a second carrier member 208 that can be coupled to one another via a plurality of screws 210. The first carrier member 206 and the crankshaft adapter 110 can be coupled for rotation via a plurality of mating spline teeth 212 and 214 that can be formed on the formed on the first carrier member 206 and the crankshaft adapter 110, respectively. The carrier pins 200 can be received through holes 216 in the first and second carrier members 206 and 208. Each of the carrier pins 200 can include a head 220 formed at a first end and a ring groove 222 formed at an opposite end. The head 220 can be received into a counterbore 226 formed in the second carrier member 208 and a retaining ring 228 can be received into the ring groove 222 and abutted against a side of the first carrier member 206 opposite the second carrier member 208 to retain the carrier pin 200 to the carrier structure 202. It will be appreciated, however, that any desired means can be employed to retain the carrier pins 200 to the carrier structure 202, including interference fits, threads, welds and/or deformation of the ends of the carrier pins 200.

Each of the planet gears 174 can be mounted on a respective one of the carrier pins 200 and can be meshingly engaged to the sun gear 170. Each planet gear 174 can include a planet gear portion 234 and a bearing element 236, such as a journal bearing, that can be received into the planet gear portion 234 and received over an associated one of the carrier pins 200. Alternatively, the planet gears 174 can be unitarily formed.

The ring gear 176 can be a gear reduction element of the transmission 114 and can include a ring gear portion 240 and a ring gear mount 242 having a radially extending wall member 244, an annular inner wall member 246 and an annular outer wall member 248 that can be spaced radially apart from the annular inner wall member 246. The ring gear portion 240 can be an annular structure that can extend in an axial direction from a side of the radially extending wall member 244 opposite the annular outer wall member 248. The ring gear portion 240 can include a set of ring gear teeth 240a that can be meshingly engaged with the planet gears 174. A bushing 250 can be received between the ring gear portion 240 and the carrier structure 202 to support an end of the ring gear portion 240 opposite the ring gear mount 242.

The bracket or torque reaction member 116 can include an annular bracket portion 260 and a bracket flange 262 that can extend radially outwardly from the annular bracket portion 260. The annular bracket portion 260 can be received between the annular inner and outer wall members 246 and 248 of the ring gear 176. A bearing set 264 can be employed to rotationally support the annular inner wall member 246 and the ring gear 176 on the annular bracket portion 260. The bracket flange 262 can be non-rotatably coupled to a non-rotating structure, such as the engine 104.

The first clutch 118, which is only schematically shown in FIG. 6 for purposes of clarity, can be received between the second adapter portion 132 of the crankshaft adapter 110 and the sun gear body 180 of the sun gear 170 and can be configured to selectively couple the sun gear 170 to the crankshaft adapter 110 for rotation therewith. The first clutch 118 can be an overrunning clutch, such as a sprag clutch, a mechanical diode or a roller ramp clutch. In the particular example provided, the first clutch 118 is a sprag clutch with an inner race 270 (FIG. 8), which is fixedly coupled to the crankshaft adapter 110, an outer race 272 (FIG. 8), which is fixedly coupled to the sun gear body 180, and a plurality of sprag elements 274 (FIG. 8) that permit power transmission in a first rotational direction from the crankshaft adapter 110 to the sun gear body 180, but inhibit power transmission in the first rotational direction from the sun gear body 180 to the crankshaft adapter 110. The sprag clutch can be of the freewheeling type, in which the sprag elements 274 (FIG. 8) pivot out of contact with one or both of the inner and outer races 270 and 272 (FIG. 8) when the sun gear 170 overruns the crankshaft adapter 110 by a predetermined speed, such as about 500 revolutions per minute, to reduce drag.

The second clutch 120 which is only schematically shown in FIG. 6 for purposes of clarity, can be received between the annular bracket portion 260 of the bracket 116 and the annular outer wall member 248 of the ring gear 176 and can be configured to selectively couple the ring gear 176 to the bracket 116. The second clutch 120 can be an overrunning clutch, such as a sprag clutch, a mechanical diode or a roller ramp clutch. In the particular example provided, the second clutch 120 is a sprag clutch with an inner race 280 (FIG. 9), which is fixedly coupled to the annular bracket portion 260, an outer race 282 (FIG. 9), which is fixedly coupled to the annular outer wall member 248, and a plurality of sprag elements 284 (FIG. 9) that permit the ring gear 176 to rotate in the first rotational direction relative to the bracket 116 but inhibit rotation of the ring gear 176 in a second rotational direction (opposite the first rotational direction) relative to the bracket 116. The sprag clutch can be of the freewheeling type, in which the sprag elements 284 (FIG. 9) pivot out of contact with one or both of the inner and outer races 280 and 282 (FIG. 9) when the ring gear 176 rotates in the first rotational direction relative to the bracket 116 at a predetermined rotational speed. The predetermined rotational speed can be selected based on various criteria, such as an engine idling speed. In the example provided, the crankshaft 102 of the engine 104 rotates at a speed of about 1250 rotations per minute when the engine 104 is at idle, and the predetermined rotational speed is selected in this example to have a value that is lower than the engine idle speed, such as 500 rotations per minute, 750 rotations per minute, or 1,000 rotations per minute.

The third clutch 122 can be configured to selectively couple the pulley 112 and the sun gear 170 for rotation. In the particular example provided, the third clutch 122 is an electromagnetic clutch 290. As electromagnetic clutches are known in the art, a detailed discussion of the electromagnetic clutch 290 need not be provided herein. Briefly, the electromagnetic clutch 290 can include a first transmitting portion 292, which can be fixed to the pulley web 154 of the pulley 112, a second transmitting portion 294, which can be fixedly coupled to the sun gear flange 182 of the sun gear 170, and an electronic actuator 296 that can be mounted to the bracket 116. The electronic actuator 296 can be operated in a first condition in which the first and second transmitting portions 292 and 294 are rotationally decoupled from one another. The electronic actuator 296 can also be operated in a second condition in which the first and second transmitting portions 292 and 294 are coupled for rotation.

The torsional vibration damper 124 can include an inner damper portion 300, an outer damper portion 302 and a coupling 304 that can be disposed between the inner and outer damper portions 300 and 302. The inner damper portion 300 can be mounted to either the crankshaft adapter 110 or the carrier structure 202 to rotate with the crankshaft adapter 110. In the example provided, the inner damper portion 300 includes a radially extending hub member 310 and an annular mount 312 that extends circumferentially about the ring gear portion 240 of the ring gear 176. The hub member 310 can be located to the carrier structure 202 in a desired manner, such as on an annular lip 316 formed on the carrier structure 202, and screws 318 can be employed to fixedly but removably couple the hub member 310 to the first carrier structure 202. The outer damper portion 302 can be an annular structure that can be disposed concentrically about the annular mount 312. The coupling 304 can resiliently couple the outer damper portion 302 to the annular mount 312 in a manner that permits the outer damper portion 302 to rotate slightly with respect to the annular mount 312 to dampen torsional vibration occurring in a predetermined range of frequencies.

With reference to FIGS. 7 and 10, the pulley assembly 100 is illustrated in a first operational mode for starting the engine 104. It will be appreciated that the engine 104 had previously been in an "off" or non-operating condition in which rotary power is not being output by the crankshaft 102 and that starting of the engine 104 will cause rotary power to be output from the crankshaft 102. Rotary power can be transmitted from a motor/generator 350 (FIG. 7) to the pulley 112 via the accessory belt 160 (FIG. 7) to cause rotation of the pulley 112 in the first rotational direction R1 (FIG. 7). The electronic actuator 296 can be operated in the second condition to rotationally couple the first and second transmitting portions 292 and 294 to permit rotary power to be transmitted from the pulley 112 to the sun gear flange 182 and thereby drive the sun gear 170 in the first rotational direction. Rotary power is not transmitted directly from the sun gear 170 to the crankshaft adapter 110 due to the first clutch 118. Rotation of the sun gear 170 in the first rotational direction causes the planet gears 174 to rotate about the carrier pins 200 and apply reaction forces to the ring gear 176 and the carrier structure 202 that would tend to rotate the carrier structure 202 in the first rotational direction R1 (FIG. 7) and the ring gear 176 in the second rotational direction R2 (FIG. 7). The second clutch 120 inhibits rotation of the ring gear 176 relative to the bracket 116 in the second rotational direction and as such, the ring gear 176 is maintained in a fixed or stationary condition so that rotary power is output from the transmission 114 via the carrier structure 202 to rotate the crankshaft adapter 110 in the first rotational direction to thereby rotate the crankshaft 102 to start the engine 104. As the pulley 352 (FIG. 7) of the motor/generator 350 (FIG. 7) is smaller in diameter than the portion of the pulley rim 152 that is engaged by the accessory belt 160, it will be appreciated that operation in the first operational mode can involve a first torque multiplication and speed reduction operation, which is performed by the pulley 352, the pulley rim 152 and the accessory belt 160, and a second torque multiplication and speed reduction operation, which is performed by the transmission 114.

With reference to FIGS. 7 and 11, the pulley assembly 100 is illustrated in a second operational mode in which the engine 104 is operating (so that rotary power is output via the crankshaft 102) and the motor/generator 350 is being driven to generate electrical power. Rotary power output from the crankshaft 102 is transmitted into the crankshaft adapter 110 to cause the crankshaft adapter 110 to rotate in the first rotational direction R1 (FIG. 7), which causes the first clutch 118 to engage so that rotary power is transmitted to the sun gear 170 to cause the sun gear 170 to rotate with the crankshaft adapter 110 in the first rotational direction R1 (FIG. 7). As the carrier structure 202 is coupled for rotation with the crankshaft adapter 110, the carrier structure 202 also rotates in the first rotational direction R1 (FIG. 7). Rotation of both the carrier structure 202 and the sun gear 170 in the first rotational direction R1 (FIG. 7) drives the ring gear 176 in the first rotational direction R1 (FIG. 7), which is permitted by the second clutch 120. The electronic actuator 296 of the third clutch 122 can be operated in the second condition to rotationally couple the first and second transmitting portions 292 and 294 to one another to permit rotary power to be transmitted from the sun gear flange 182 to the pulley 112 and thereby drive the pulley 112 in the first rotational direction R1 (FIG. 7). Rotary power is output from the pulley 112 via the accessory belt 160 and provided to the pulley 352 (FIG. 7) of the motor/generator 350 (FIG. 7).

Figure 12:
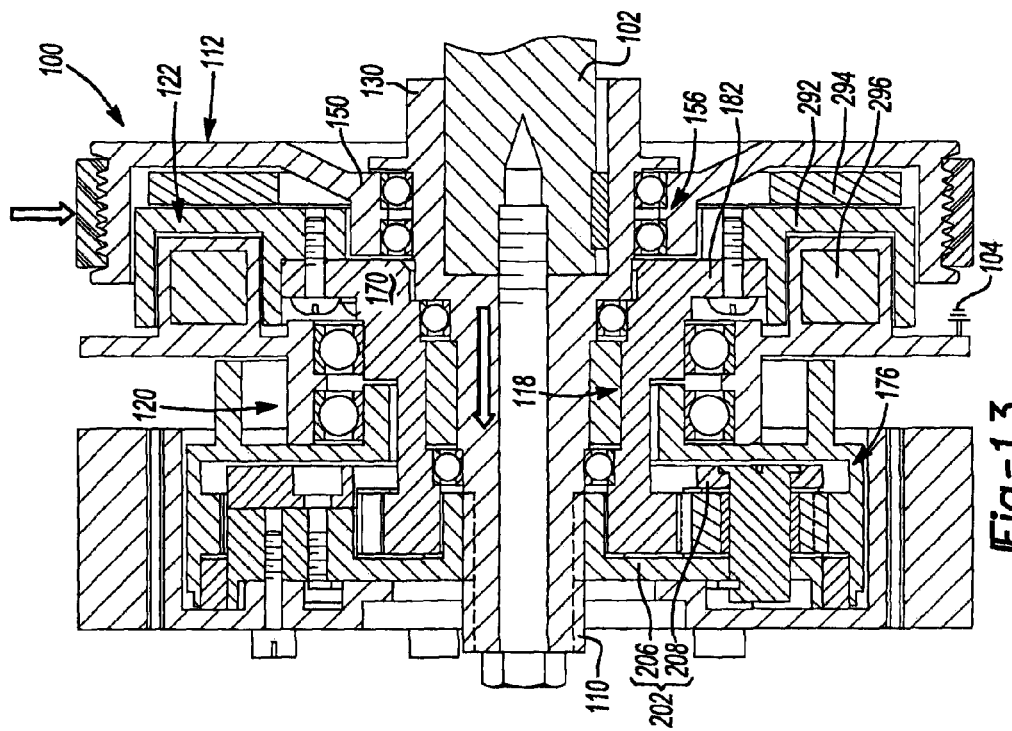
FIG. 12 is a view similar to that of FIG. 6 but illustrating the transmission of rotary power through the pulley assembly when the pulley assembly is operated in a third mode.

With reference to FIGS. 7 and 12, the pulley assembly 100 is illustrated in a third operational mode in which the engine 104 in an "off" or non-operating condition in which rotary power is not being output by the crankshaft 102 and the motor/generator 350 (FIG. 7) is operated to provide rotary power (via the accessory belt 160 (FIG. 7)) to various other belt-driven accessories, such as a power steering pump 360 (FIG. 7), a water pump 362 (FIG. 7), an air compressor 364 (FIG. 7) and an air conditioning compressor 366 (FIG. 7). Rotary power can be transmitted from the motor/generator 350 (FIG. 7) to the pulley 112 via the accessory belt 160 (FIG. 7) to cause rotation of the pulley 112 in the first rotational direction R1 (FIG. 7). The electronic actuator 296 of the third clutch 122 can be operated in the first mode to rotationally decouple the first and second transmitting portions 292 and 294. As the pulley hub 150 is supported by the bearing set 156 on the first adapter portion 130, rotary power from the accessory belt 160 drives the pulley 112 in the first rotational direction R1 (FIG. 7) without transmitting rotary power to either the sun gear 170 or the crankshaft adapter 110.

Figure 13:
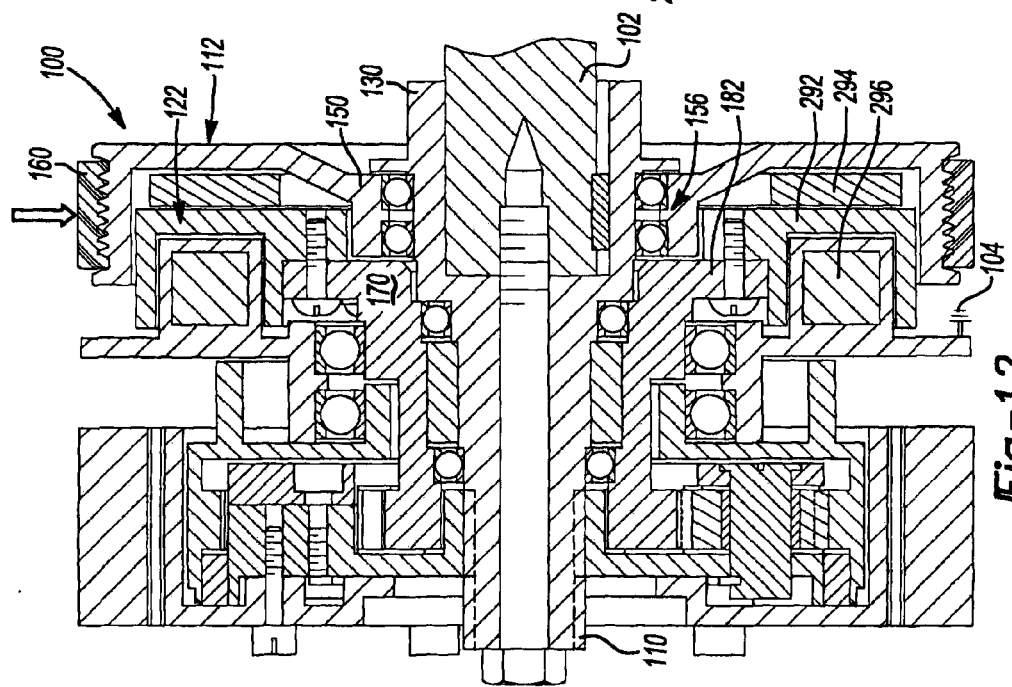
FIG. 13 is a view similar to that of FIG. 6 but illustrating the transmission of rotary power through the pulley assembly when the pulley assembly is operated in a fourth mode.

With reference to FIGS. 7 and 13, the pulley assembly 100 is illustrated in a fourth operational mode in which the engine 104 is being started by a conventional starter motor (not shown) to rotate a flywheel (not shown) that is coupled to the crankshaft 102 while the motor/generator 350 (FIG. 7) is operated to provide rotary power (via the accessory belt 160 (FIG. 7)) to the various other belt-driven accessories. As with the previous example, the electronic actuator 296 of the third clutch 122 can be operated in the first mode to rotationally decouple the first and second transmitting portions 292 and 294. As the pulley hub 150 is supported by the bearing set 156 on the first adapter portion 130, rotary power from the accessory belt 160 (FIG. 7) drives the pulley 112 in the first rotational direction R1 (FIG. 7) without transmitting rotary power to either the sun gear 170 or the crankshaft adapter 110.

Rotary power output from the crankshaft 102 is transmitted into the crankshaft adapter 110 to cause the crankshaft adapter 110 to rotate in the first rotational direction R1 (FIG. 7), which causes the first clutch 118 to engage so that rotary power is transmitted to the sun gear 170 to cause the sun gear 170 to rotate with the crankshaft adapter 110 in the first rotational direction R1 (FIG. 7). As the carrier structure 202 is coupled for rotation with the crankshaft adapter 110, the carrier structure 202 also rotates in the first rotational direction R1 (FIG. 7). Rotation of both the carrier structure 202 and the sun gear 170 in the first rotational direction R1 (FIG. 7) drives the ring gear 176 in the first rotational direction R1 (FIG. 7), which is permitted by the second clutch 120. As the electronic actuator 296 of the third clutch 122 is operated in the first condition to rotationally decouple the first and second transmitting portions 292 and 294, rotary power is not transmitted from the sun gear flange 182 through the third clutch 122 to the pulley 112. Accordingly, it will be appreciated that electrical power to the motor/generator 350 (FIG. 7) may be interrupted and thereafter the electronic actuator 296 of the third clutch 122 can be operated in the second condition to cause the accessory pulley 112 to operate in the second operational mode.

Figure 14:
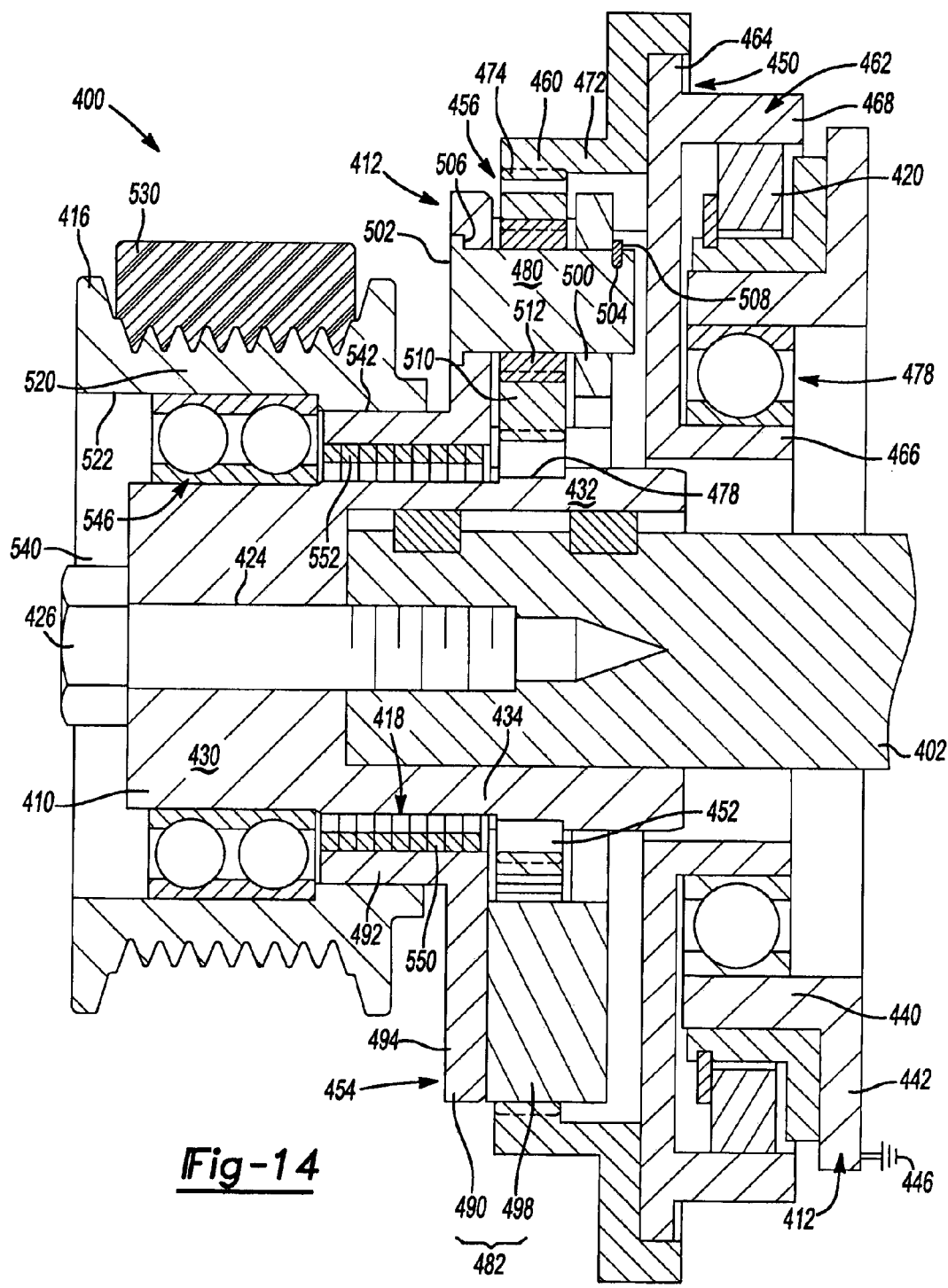
FIG. 14 is a cross sectional view of another pulley assembly constructed in accordance with the teachings of the present disclosure.
Figure 15:
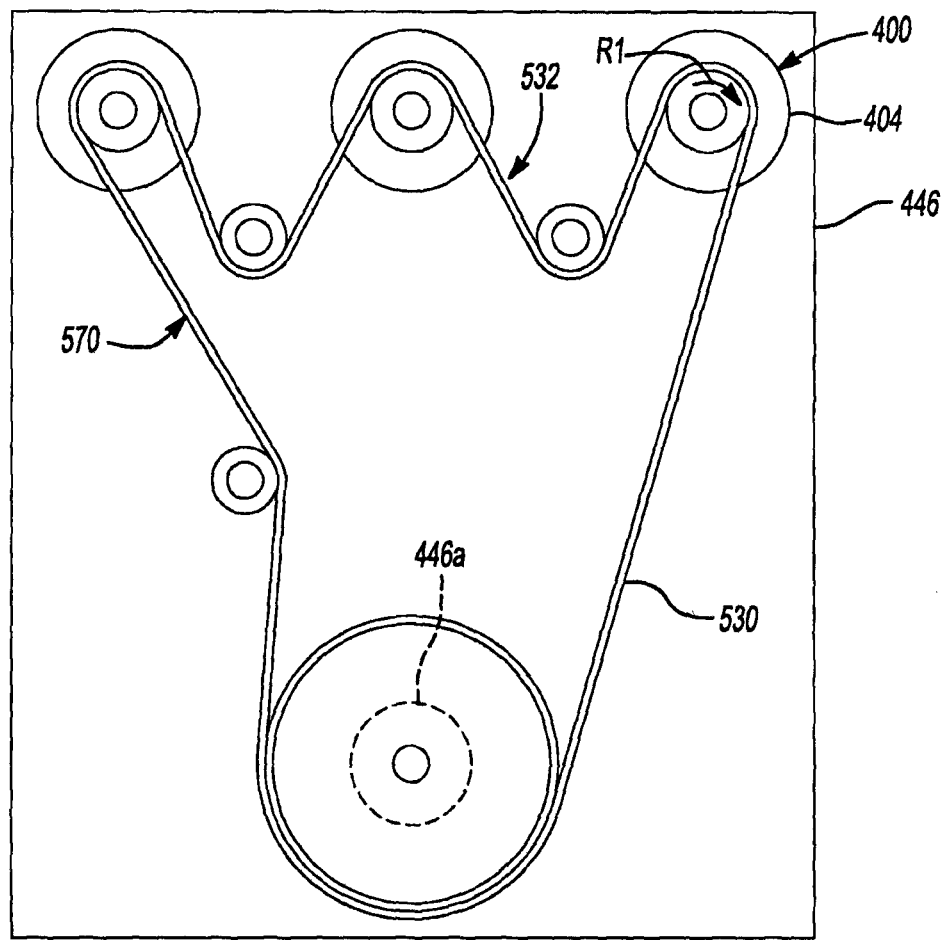
FIG. 15 is a schematic illustration of an engine having an accessory drive system with the pulley assembly of FIG. 14.

With reference to FIGS. 14 and 15, a pulley assembly 400 constructed in accordance with the teachings of the present disclosure is illustrated in operative association with the shaft 402 of a motor/generator 404. The pulley assembly 400 can include a shaft adapter 410, a bracket 412, a transmission 414, a pulley 416, a first clutch 418, and a second clutch 420.

The shaft adapter or hub 410 can be configured to be matingly engaged to the shaft 402 of the motor/generator 404 and can include an aperture 424 that can receive a threaded fastener 426 there through that can be threadably engaged to the shaft 402 to fixedly couple the shaft 402 and the shaft adapter 410. In the example provided, the shaft adapter 410 includes a bearing mount 430 at a first end, a sun gear mount 432 at an opposite end, and a clutch mount 434 between the bearing mount 430 and the sun gear mount 432.

The bracket or torque reaction member 412 can include an annular bracket hub 440 and a bracket flange 442 that can extend radially outwardly from the bracket hub 440. The bracket flange 442 can be fixedly coupled to a stationary structure, such as an engine 446.

The transmission 414 can include one or more stages that can be employed to perform a torque multiplication and speed reduction function. In the example provided, the transmission 414 is a single-stage, planetary-type transmission having a ring gear 450, a sun gear 452, a planet carrier 454, and a plurality of planet gears 456. The ring gear 450 can be a gear reduction element of the transmission 412 and can include a ring gear portion 460 and a ring gear mount 462 having a radially extending wall member 464, an annular inner wall member 466, and an annular outer wall member 468. The ring gear portion 460 can have an annular portion 472 with a set of ring gear teeth 474 that can be meshingly engaged with the planet gears 456. The radially extending wall member 464 can be fixedly coupled with the ring gear portion 460. The annular inner and outer wall members 466 and 468 can be disposed concentrically about the bracket hub 440. A bearing 478 can be received between the bracket hub 440 and the annular inner wall member 466 to rotatably support the ring gear 450 on the bracket 412.

The sun gear 452 can be an input member of the transmission 412 and can be fixedly coupled to the sun gear mount 432 on the shaft adapter 410. In the example provided, the sun gear 452 includes a non-circular (e.g., hexagonal shaped) aperture 478 and the sun gear mount 432 is correspondingly shaped to matingly engage the sun gear 452 with an interference fit.

The planet carrier 454 can be an output member of the transmission 412 and can include a plurality of carrier pins 480, which can generally support the planet gears 456, and a carrier structure 482 that can be rotatably to the pulley 416. In the example provided, the carrier structure 482 includes a first carrier member 490, which can include an annular clutch hub 492 and a radially extending carrier flange 494, and a second carrier member 498 that can be a plate-like structure. The carrier pins 480 can be received through holes 500 in the first and second carrier members 490 and 498. Each of the carrier pins 480 can include a head 502 formed at a first end and a ring groove 504 formed at an opposite end. The head 502 can be received into a counterbore 506 formed in the radially extending carrier flange 494 and a retaining ring 508 can be received into the ring groove 504 and abutted against a side of the second carrier member 498 opposite the first carrier member 490 to retain the carrier pin 480 to the carrier structure 482. It will be appreciated, however, that any desired means can be employed to retain the carrier pins 480 to the carrier structure 482, including interference fits, threads, welds and/or deformation of the ends of the carrier pins 480.

Each of the planet gears 456 can be mounted on a respective one of the carrier pins 480 and can be meshingly engaged to the sun gear 452. Each planet gear 456 can include a planet gear portion 510 and a bearing element 512, such as a journal bearing, that can be received in the planet gear portion 510 and received over an associated one of the carrier pins 480. Alternatively, the planet gears 456 can be unitarily formed.

The pulley 416 can be an annular structure having a pulley rim 520 and a central bore 522. The pulley rim 520 can be configured to engage an accessory belt 530 that can be employed to transmit rotary power through a vehicle accessory drive system 532. The central bore 522 can include a first bore portion 540 and a second bore portion 542. A bearing set 546 can be received into the first bore portion 540 and engaged to the bearing mount 430 to support the pulley 416 for rotation on the shaft adapter 410. The annular clutch hub 492 of the first carrier member 490 can be received into the second bore portion 542 and can be fixedly coupled to the pulley 416, such that the pulley 416 and the first carrier member 490 co-rotate.

The first clutch 418 can be received between the annular clutch hub 492 and the clutch mount 434 and can be configured to selectively couple the shaft adapter 410 to the first carrier member 490 for rotation therewith. The first clutch 418 can be an overrunning clutch, such as a sprag clutch, a mechanical diode, or a roller ramp clutch. In the particular example provided, the first clutch 418 includes a wrap spring 550 that is formed of spring wire having a cross-sectional shape with a generally square or rectangular shape with rounded corners. The wire can be "bare" wire (i.e., not having a non-metallic or semi-metallic layer that is disposed on the outer side of the wrap spring 550) and can be plain wire or a plated (e.g., electroplated) wire. The wrap spring 550 can be received into the annular clutch hub 492 such that the coils 552 of the wrap spring 550 are engaged in a press-fit manner with the interior surface 558 of the annular clutch hub 492. An end of the wrap spring 550 can be received into a groove (not specifically shown) formed about a portion of the circumference of the clutch mount 434 and fixedly coupled to the shaft adapter 410.

Figure 16:
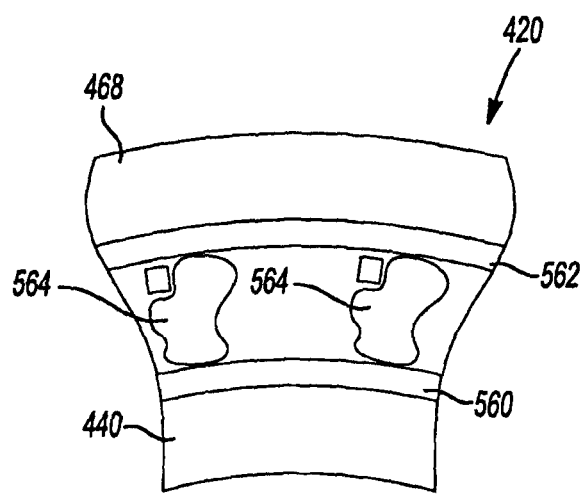
FIG. 16 is an elevation view of a portion of the pulley assembly of FIG. 14 illustrating a portion of the second clutch in more detail.

The second clutch 420 can be received between the bracket hub 440 and the annular outer wall member 468 and can be configured to selectively couple the ring gear 450 to the bracket 412 to inhibit relative rotation therebetween. The second clutch 420 can be an overrunning clutch, such as a sprag clutch, a mechanical diode, or a roller ramp clutch. In the particular example provided, the second clutch 420 is a sprag clutch with an inner race 560 (FIG. 16), which is fixedly coupled to the bracket hub 440, an outer race 562 (FIG. 16), which is fixedly coupled to the annular outer wall member 468, and a plurality of sprag elements 564 (FIG. 16) that permit the ring gear 450 to rotate in a first rotational direction relative to the bracket 412 but inhibit rotation of the ring gear 450 in a second rotational direction (opposite the first rotational direction) relative to the bracket 412. The sprag clutch can be of the free wheeling type in which the sprag elements 564 (FIG. 16) pivot out of contact with one or both of the inner and outer races 560 and 562 (FIG. 16) when the ring gear 45° rotates in the first rotational direction at a predetermined rotational speed.

Figure 17:
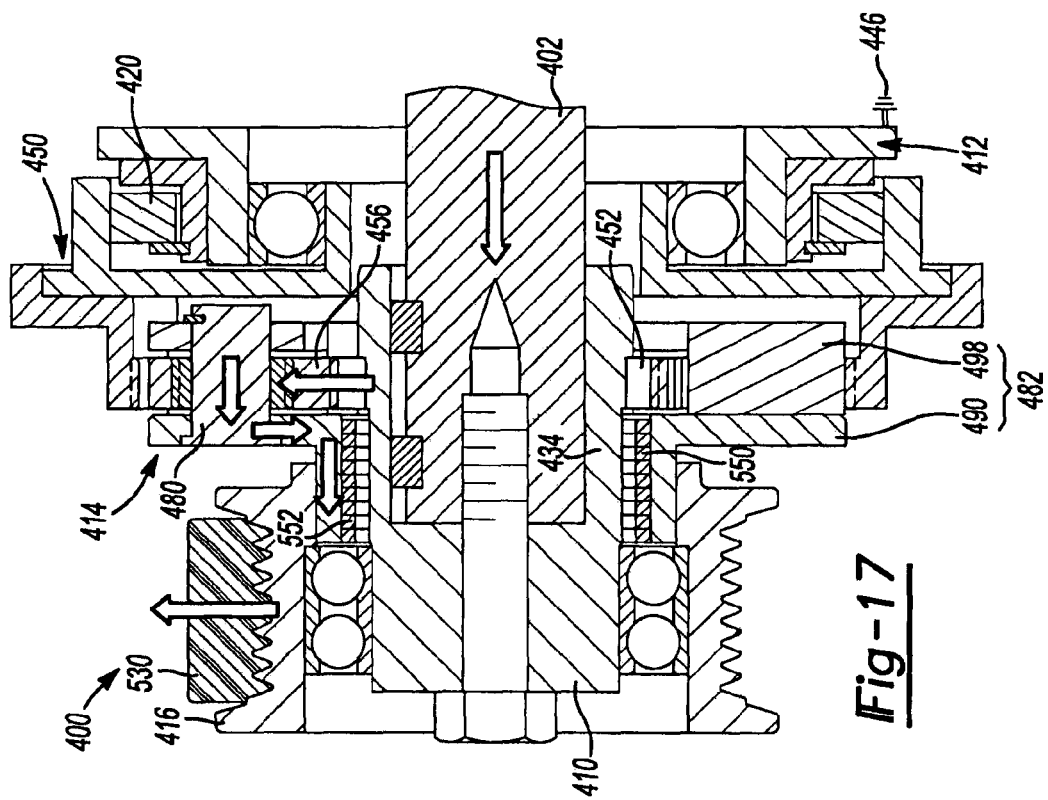
FIG. 17 is a view similar to that of FIG. 14 but illustrating the transmission of rotary power through the pulley assembly when the pulley assembly is operated in a first mode.

With reference to FIGS. 15 and 17, the pulley assembly 400 is illustrated in a first operational mode for starting the engine 446. Rotary power can be transmitted from the motor/generator 404 to the shaft adapter 410 to cause the shaft adapter 410 to rotate in the first rotational direction R1 (FIG. 15). As the end of the wrap spring 550 is fixedly coupled to the shaft adapter 410, rotation of the shaft adapter 410 in the first rotational direction R1 (FIG. 15) tends to contract the coils 552 of the wrap spring 550 about the clutch mount 434 such that the wrap spring 550 rotates relative to the first carrier member 490. Rotation of the shaft adapter 410 also rotates the sun gear 452, causing the planet gears 456 to rotate about the carrier pins 480 and apply a reaction force to the ring gear 450 and a reaction force to the carrier structure 482 that would tend to rotate the carrier structure 482 in the first rotational direction R1 (FIG. 15) and the ring gear 450 in the second rotational direction R2 (FIG. 15). The second clutch 420 inhibits rotation of the ring gear 450 relative to the bracket 412 in the second rotational direction R2 (FIG. 15) and as such, the ring gear 450 is maintained in a fixed or stationary condition, so that rotary power is output from the transmission 414 via the carrier structure 482 to rotate the pulley 416 (which is fixedly coupled to the first carrier member 490 of the carrier structure 482) in the first rotational direction R1 (FIG. 15). Rotary power transmitted to the pulley 416 is output to the accessory belt 530 to rotate a crankshaft 446*a* to start the engine 446, and/or to drive a set of vehicle accessories 570.

Figure 18:
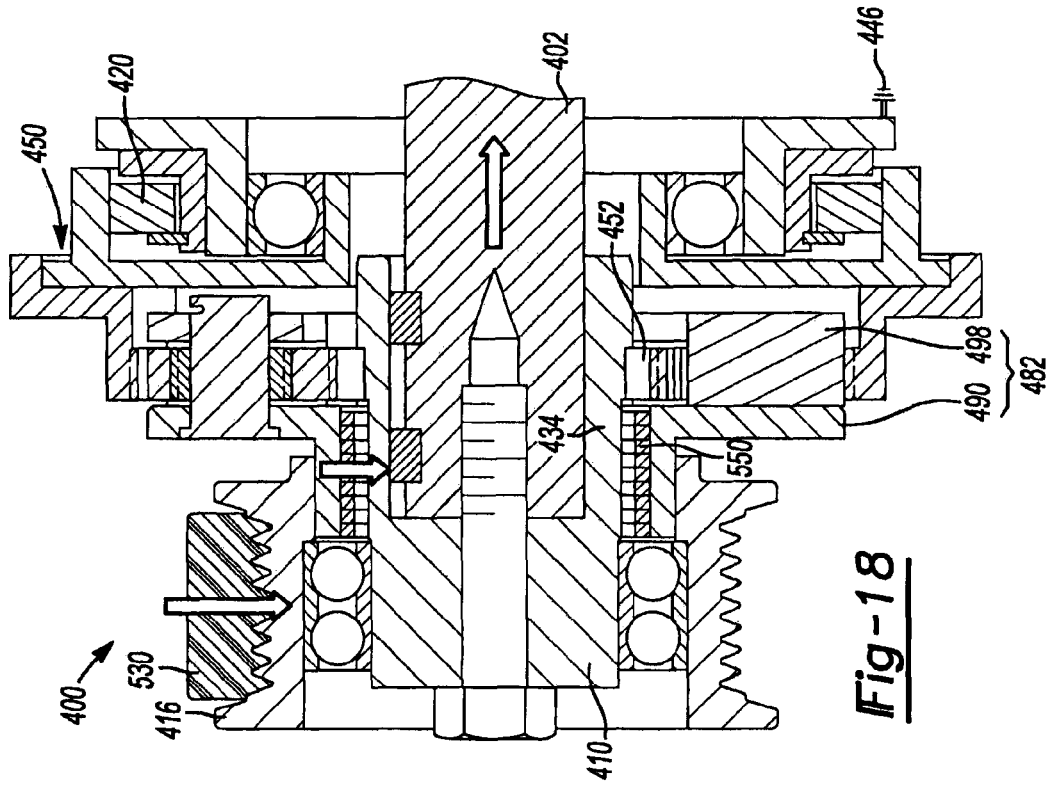
FIG. 18 is a view similar to that of FIG. 14 but illustrating the transmission of rotary power through the pulley assembly when the pulley assembly is operated in a second mode.

With reference to FIGS. 15 and 18, the pulley assembly 400 is illustrated in a second operational mode in which rotary power is input to the pulley from the accessory belt 530 to rotate the shaft 402 of the motor/generator 404 to cause the motor/generator 404 to produce electrical power. Rotation of the pulley 416 in the first rotational direction R1 (FIG. 15) causes corresponding rotation of the first carrier member 490. Rotation of the first carrier member 490 in the first rotational direction R1 (FIG. 15) tends to cause the wrap spring 550 to uncoil somewhat and further engage the first carrier member 490 so as to provide a robust path through which torque may be transmitted to the shaft adapter 410 to cause both the sun gear 452 and the shaft 402 of the motor/generator 404 to rotate in the first rotational direction R1 (FIG. 15). As the sun gear 452 is coupled for rotation with the shaft adapter 410, rotation of both the carrier structure 482 and the sun gear 452 in the first rotational direction R1 (FIG. 15) causes rotation of the ring gear 450 in the first rotational direction R1 (FIG. 15), which is permitted by the second clutch 420. Accordingly, rotary power received by the shaft adapter 410 is transmitted to the shaft to drive the motor/generator 404.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A pulley assembly comprising:
   a hub;
   a pulley rotatably mounted on the hub;
   a transmission having an input member and an output member;
   a torque reaction member;
   a first clutch disposed between the input member and the hub, the first clutch coupling the input member to the hub when the hub transmits rotary power to the input member as the hub rotates in a first rotational direction;
   a second clutch disposed between the torque reaction member and a reduction element of the transmission, the second clutch being operable in a first mode that couples the torque reaction member to the reduction element to cause the transmission to operate such that a speed reduction and torque multiplication operation is performed by the transmission and output from the output member to the hub, the second clutch being operable in a second mode in which the torque reaction member is decoupled from the reduction element; and
   a third clutch operable for selectively coupling the pulley to the input member to cause the pulley to co-rotate with the input member.

2. The pulley assembly of claim 1, wherein the output member is coupled to the hub for rotation therewith.

3. The pulley assembly of claim 1, further comprising a torsional vibration damper coupled for rotation to the hub.

4. The pulley assembly of claim 1, wherein the third clutch comprises an electronically-controlled actuator that controls operation of the third clutch.

5. The pulley assembly of claim 4, wherein the actuator comprises an electromagnetic clutch.

6. The pulley assembly of claim 1, wherein the transmission is a planetary-type transmission.

7. The pulley assembly of claim 6, wherein the input member is a sun gear, the output member is a planet carrier and the reduction element is a ring gear.

8. The pulley assembly of claim 7, wherein the ring gear includes a first annular wall member and a second annular wall member that is radially outwardly of the first annular wall member, wherein the bracket includes an annular bracket portion disposed between the first and second annular wall members, wherein a bearing is disposed between the first annular wall member and the annular bracket portion, and wherein the second clutch is disposed between the annular bracket portion and the second annular wall member.

9. The pulley assembly of claim 1, wherein at least one of the first and second clutches comprises an overrunning clutch.

10. The pulley assembly of claim 9, wherein the second clutch comprises a sprag clutch, a mechanical diode, or a roller ramp clutch.

11. The pulley assembly of claim 9, wherein the first clutch comprises a sprag clutch, a mechanical diode, or a roller ramp clutch.

12. The pulley assembly of claim 11, wherein the first clutch includes an inner race, an outer race and a plurality of sprag elements that lift off at least one of the inner race and the outer race when a rotational speed of the hub in the first direction exceeds a predetermined rotational speed.

13. A pulley assembly that is adapted to transmit rotary power between a crankshaft and a vehicle accessory drive system, the pulley assembly comprising:
   a crankshaft adapter that is adapted to be coupled to the crankshaft;
   a pulley that is rotatably mounted on the crankshaft adapter;
   a transmission having a transmission input and a transmission output; and
   a clutch system that permits the pulley assembly to be operated in a first mode, a second mode and a third mode, the first mode being configured to couple the crankshaft adapter to the pulley to permit the pulley to co-rotate with the crankshaft adapter in a first rotational direction such that rotary power is transmitted from the crankshaft adapter to the pulley, the second mode being configured to couple the pulley to the crankshaft adapter through the transmission such that the transmission performs a torque multiplication and speed reduction function which causes the crankshaft adapter to rotate in the first rotational direction at a speed that is slower than a rotational speed of the pulley, the third mode being configured to decouple the pulley from the crankshaft adapter such that rotation of the pulley does not effect rotation of the crankshaft adapter.

14. The pulley assembly of claim 13, wherein the clutch system includes at least two overrunning clutches.

15. The pulley assembly of claim 14, further comprising a bracket that is adapted to be fixedly coupled to the engine, wherein the transmission is a planetary-type transmission and wherein the ring gear is mounted for rotation on the bracket.

16. A pulley assembly comprising:
   a shaft adapter that is adapted to be coupled to a shaft;
   a pulley that is rotatably mounted on the shaft adapter;
   a transmission having a transmission input member, a transmission output member and a reduction element, wherein rotation of the shaft adapter in a first rotational direction drives the pulley through the transmission so as to obtain a selected gear reduction between the shaft adapter and the pulley;

a bracket that is adapted to be coupled to a stationary object;

a wrap spring clutch that is disposed concentrically between the shaft adapter and the transmission output member and that is positioned to transfer torque from the pulley to the shaft adapter in a first rotational direction without a gear reduction; and an overrunning clutch that couples the reduction element to the bracket to permit rotation of the reduction element relative to the bracket in a first rotational direction but inhibit rotation of the reduction element relative to the bracket in a second rotational direction opposite the first rotational direction.

17. The pulley assembly of claim 16, wherein the overrunning clutch comprises a sprag clutch, a mechanical diode, or a roller ramp clutch.

18. The pulley assembly of claim 16, wherein the wrap spring clutch is formed of a bare wire.

19. The pulley assembly of claim 18, wherein a lubricant is disposed on the bare wire.

20. The pulley assembly of claim 19, wherein the transmission is a planetary-type transmission.

* * * * *